United States Patent Office 3,099,532
Patented July 30, 1963

3,099,532
METHOD OF MAKING HIGH PURITY, SUBSTANTIALLY SPHERICAL DISCRETE PARTICLES OF BERYLLIUM HYDROXIDE OR OXIDE
William J. Kirkpatrick, Cincinnati, and Earl S. Funston, Hamilton, Ohio, assignors to General Electric Company, a corporation of New York
No Drawing. Filed Aug. 28, 1961, Ser. No. 134,152
4 Claims. (Cl. 23—183)

This invention relates to beryllium compounds and, more particularly, to discrete, dense, high purity beryllium oxide particles and method of making same by first producing discrete particles of high purity beryllium hydroxide.

Beryllium oxide, sometimes referred to as beryllia, is widely used in the electrical industry as electrical insulators as well as in the atomic reactor field as a component of fuel elements and as reflectors and shielding. In these applications, the components may be made from pure beryllia while others are composite bodies including beryllia as the matrix.

In the past, low calcined beryllia was prepared by roasting the oxalate, sulfate or hydroxide, accepting whatever size and shape happened to be incidental to the process. Powders made in this manner have a wide variation in particle size and shape with many particles being agglomerated into hard structures that are extremely difficult to break up. Small individual, discrete particles are needed to give good sinterability and good flow characteristics in fabrications such as in extrusion. In addition, if densification of a beryllia article is not adequate, such properties as thermal conductivity, moderating efficiency as well as strength decrease. Dense uniform particles of BeO make possible more control over grain growth in the final stages of sintering. The increased control reduces the probability of massive and preferential grain growth which would result in the weakening of the ceramic body because the ultimate strength for BeO is inversely proportional to the size of the largest grains.

Therefore one object of this invention is to provide small individual discrete particles of beryllia of uniform size and shape to allow the production of beryllia articles of higher density and strength.

Another object is to provide small, individual discrete precipitate impurities is that trace elements form fine particles of beryllium oxide can be made.

Another serious defect in available BeO powders is the presence of adsorbed and occluded impurities. Attempts to remove impurities by roasting, washing, electrodialysis and acid-leaching of the BeO powder has resulted in their partial removal. But such processing has an adverse effect on sinterability. The high purity of BeO powder prevents glassy and low-melting intergranular phases which cause weakness at high temperatures.

Another object of this invention is to provide a uniformly sized and shaped BeO powder of improved high purity by first providing high purity Be(OH)$_2$.

These and other objects and advantages will be apparent from the following more detailed description and examples which are meant to be exemplary of rather than limitations on this invention, the scope of which is defined by the appended claims.

Briefly stated, this invention in its method form comprises making an aqueous colloidal suspension of micelles of Be(OH)$_2$ by hydrolyzing an aqueous solution of a beryllium basic salt of an organic acid, and then increasing the pH of the solution to precipitate substantially spherical, discrete particles of Be(OH)$_2$.

In its preferred form, the method of this invention comprises hydrolyzing a high purity water suspension of beryllium basic acetate to form a colloidal suspension of micelles of Be(OH)$_2$ in dilute acetic acid and then slowly increasing the pH of the solution to a value of 5 or higher by distilling off dilute acetic acid to precipitate substantially spherical, discrete particles of Be(OH)$_2$.

Beryllia now commercially available is sufficiently low in cationic impurities for many uses. However it does contain excessive anionic impurities such as sulfates or fluorides. For example, sulfate ions even in low concentrations inhibit uniform sintering and cause blistering, pocking, spalling and general lack of dimensional stability in articles manufactured from the beryllia. This is especially true if the beryllia matrix contains other oxides which are prone to form oxysulfides during sintering. Because sulfates are strongly adsorbed on basic material such as beryllium hydroxide or beryllium oxide, some compound other than the sulfate is needed in order to obtain sulphur-free beryllia. Beryllia obtained by calcining recrystallized BeSO$_4$ or by precipitating Be(OH)$_2$ from a sulfate solution to the oxide will usually yield beryllia having a comparatively high sulphur content.

Beryllium oxalate is sometimes used to overcome this difficulty and can give a product when calcined which is low in sulfate. However, the separation factor in such a process is so low that many recrystallizations are necessary.

Another problem encountered when using oxalates to precipitate impurities is that trace elements form fine particles or colloids which can readily pass through the pores of the best grades of filter paper. This makes it impossible to achieve a high purity product.

It was recognized that a high purity beryllium basic acetate, a beryllium basic salt of acetic acid, can be hydrolyzed to a colloidal suspension of micelles of Be(OH)$_2$ with a few anions of the organic acid—acetic acid—attached. It can thereafter be precipitated to substantially spherical particles of Be(OH)$_2$ rather than the irregularly shaped particles of less readily controlled size resulting from known methods. Therefore, it is preferred that beryllium basic acetate of high purity be used as a starting compound in the practice of this invention. However other beryllium basic salts which will hydrolyze to micelles of Be(OH)$_2$ can be used as a starting compound. Examples of such other compounds are beryllium basic formate and beryllium basic propionate.

In our co-pending application Serial No. 84,303 filed January 23, 1961, and assigned to the assignee of this application, there was described a method for making high purity beryllium basic acetates.

Although beryllium basic acetate when dissolved in certain organic solvents such as most of the unsaturated hydrocarbon types is readily converted into beryllium oxide by burning in air, there is a serious problem in connection with the collection of the dust associated with direct burning. Accordingly, the present invention provides a wet chemical method for converting beryllium basic acetate to beryllium hydroxide of substantially spherical shape which can be converted to beryllium oxide of improved sinterability.

The spherical particle is the preferred shape for extrusion and cold pressing because it has better sintering and packing characteristics than fragmented particles of random shape. Although particle shape is an important criterion, of equal importance is the particle size and size distribution.

In dense polycrystalline materials, the orientation and size of the grains strongly influence the physical properties of the materials. In sintering, large grains tend to grow at the expense of the small grains. If the system is initially composed of uniform particles all having nearly identical particle size diameter, then it can be expected that the rate of grain growth in the body will be uniform. However a range of small particle sizes to approach near-perfect packing is sought in order to promote densification. By controlling the rate at which BeO is homogeneously precipitated and hydrolyzing the basic acetate solution according to the method of this invention, small high density particles can be precipitated that have desirable characteristics necessary to give readily sinterable beryllia of high purity.

It was found that, although there are a number of methods for converting beryllium basic acetate to berryllium hydroxide, not all result in spherical, discrete particles of high density and high purity as results from the method of this invention. Precipitation of $Be(OH)_2$ from solutions or suspensions including anions of mineral acids gives the so-called metastable or alpha modification of $Be(OH)_2$. This modification is believed to be a basic salt with a small number of anions such as chloride anions substituted for hydroxyl ions. X-ray diffraction patterns have shown the alpha-$Be(OH)_2$ to be different from that of the stable or beta modification of $Be(OH)_2$.

The classical method of preparing the stable modification of $Be(OH)_2$ is to precipitate the metastable modification (basic salt) and then to digest the precipitate with $NH_4OH$, $NaOH$, or other alkali until the stable modification is formed. This method gives a product with a wide range of particle sizes and usually some gel as well.

The improved beryllia of the present invention is obtained by hydrolyzing high purity beryllium basic acetate, such as that obtained by the method of the above identified co-pending application, into an aqueous colloidal suspension of micelles of $Be(OH)_2$ and then slowly increasing the pH of the solution to precipitate beryllium hydroxide as roughly spherical particles such as by evaporating or extracting sufficient acetic acid from the hydrolyzate. The size of the particles depends on time and temperature at which the precipitation is carried out.

Alternatively, the precipitation may be carried out in the presence of a source of hydroxyl ions in low concentration, preferably by the use of ammonia gas diluted with air, nitrogen or an inert gas. However, an ammonia treatment, where desired, is more conveniently carried out on the washed precipitate.

According to the present invention, it was found that spherical, high density particles of the stable or beta modification of $Be(OH)_2$ can be precipitated from an aqueous colloidal suspension of micelles of $Be(OH)_2$. It is preferred that such a solution be made by dissolving beryllium basic acetate in boiling water to form a beryllium hydroxide colloid suspension. The precipitation is preferably brought about by raising the pH of such a suspension slowly and preferably homogeneously until a pH of 5 or higher is reached. The change in pH can be accomplished preferably by distilling off acetic acid or by dispersing a mixture of $NH_3$ and air (such as 1:10 by volume) into the boiling hydrolyzed beryllium basic acetate aqueous solution. The distillation procedure is preferred because the $Be(OH)_2$ is produced as high density spherulites the size of which can be controlled by the length of time they are kept in the precipitation zone. The $Be(OH)_2$ thus obtained is readily converted by calcining to high density substantially spherical discrete particles of BeOH powder.

*Example*

Beryllium basic acetate prepared according to the method described in the above identified co-pending application was weighed into portions of 1 kg. Each portion was charged into a 5 liter Pyrex balloon flask along with 3 liters of water. The mixture was boiled gently until the beryllium basic acetate was hydrolyzed forming a clear solution. Any water insoluble materials were removed by filtering the solution through a fine fritted glass filter. Nine portions of the filtered solutions were charged into a 50 gallon Pfaudler autoclave and the liquid level brought up to the 42 gallon mark by adding de-ionized water.

Dilute acetic acid was distilled off until the liquid level fell to the 11 gallon mark in the autoclave. Again the level was brought up to the 42 gallon mark and more acetic acid was distilled off. During the second distillation after about 10 gallons had distilled over, precipitation started rapidly. As was mentioned before, the time the distillation is continued determines the particle size. In this example, 2 hours distillation yielded particles of which 60 weight percent will be below 1 micron.

When the particles reached the desired size, the precipitate was collected on a filter using Whatman's No. 50 filter paper although centrifugal or other separation means can be used as well. The $Be(OH)_2$ was washed with pure water and dried at 125° C. The result was high purity, spherical, dense $Be(OH)_2$.

The $Be(OH)_2$ was then calcined to spherical dense BeO in an air atmosphere furnace provided with a constant flow of air through the hot zone and a filtered venting for carrying away dust as well as decomposition products.

High purity samples of $Be(OH)_2$ when calcined using ordinary furnaces picked up high concentrations of Si, Cr, S, P and B. The air flow through the vented furnace system precluded the absorption of vapors by the BeO during calcination and precluded the carbonization of traces of organic material, if present.

The calcination schedule followed in this example was first to oven dry the beryllium hydroxide at 110° C. to remove uncombined water. After cooling, the dried material was poured into high-fired alumina saggers to a bed depth of up to 3 inches. Alumina lids were placed over the saggers to prevent any furnace brick work particles from falling into the powder. The saggers were placed in the furnace and allowed to heat up to 230° C. and held for about 6 hours. The temperature was then increased to 540° C. and held for 16 hours. By this time a large amount of the combined water had been removed the temperature was then raised at a rate of 40° C. per hour until it reached 950–970° C., where it was held for about 8 hours to remove all absorbed volatiles from the pores as well as removal of the adsorbed volatiles on the surface of the crystallites.

Upon completion of the calcination cycle, the saggers were allowed to cool in the furnace until they could be handled.

The powders which resulted from this processing were spherical BeO powders of high density and high purity. By adjusting the size of the spherical particles as has been mentioned above, mixtures of BeO powders can be made which result in unusually high density BeO articles.

Although this invention has been described in connection with specific examples, it will be understood by those skilled in the art of chemistry, particularly colloid chemistry, the variations and modifications in materials and processing procedures of which this invention is capable.

What is claimed is:

1. A method of making high purity, substantially spherical, beryllium hydroxide comprising the steps of: mixing a beryllium basic salt of an organic acid with water; hydrolyzing the aqueous mix to form an aqueous colloidal suspension of micelles of $Be(OH)_2$ and the organic acid; and then removing portions of the organic acid to precipitate substantially spherical, discrete particles of $Be(OH)_2$.

2. A method of making high purity, substantially spherical, beryllium hydroxide comprising the steps of: mixing beryllium basic acetate with water; hydrolyzing the beryllium basic acetate mix to form an aqueous colloidal suspension of micelles of $Be(OH)_2$ in dilute acetic acid; and then slowly removing portions of the acetic acid to increase the pH of the mixture to a value of at least about 5 to precipitate substantially spherical, discrete particles of Be(OH)$_2$.

3. A method for making high purity, substantially spherical, dense beryllium oxide comprising the steps of: mixing a beryllium basic salt of an organic acid with water; hydrolyzing the mix to form an aqueous colloidal suspension of micelles of Be(OH)$_2$ and the organic acid; removing portions of the organic acid to precipitate substantially spherical, discrete particles of Be(OH)$_2$; separating the Be(OH)$_2$ from the suspension; and then calcining the Be(OH)$_2$ in air while continually removing products of vaporization and decomposition to form high purity, dense, substantially spherical discrete particles of BeO.

4. A method for making high purity, substantially spherical particles of dense beryllium oxide comprising the steps of: mixing beryllium basic acetate with water; heating the mix to hydrolyze the mix into an aqueous colloidal suspension of micelles of Be(OH)$_2$ in dilute acetic acid; removing portions of dilute acetic acid from the mix slowly to precipitate Be(OH)$_2$ in spherical discrete particles; separating the Be(OH)$_2$ from the suspension; and then calcining the Be(OH)$_2$ in air while continually removing products of vaporization and decomposition to form high purity, dense, substantially spherical discrete particles of BeO.

References Cited in the file of this patent
UNITED STATES PATENTS

| | | |
|---|---|---|
| 2,298,800 | McKee | Oct. 13, 1942 |
| 2,399,178 | Furlaud | Apr. 30, 1946 |
| 2,818,605 | Miller | Jan. 7, 1958 |
| 2,899,276 | Hutter | Aug. 11, 1959 |
| 2,974,012 | Cooperstein | Mar. 7, 1961 |